US009185434B2

(12) United States Patent
Agnihotri et al.

(10) Patent No.: US 9,185,434 B2
(45) Date of Patent: Nov. 10, 2015

(54) SYSTEM AND METHOD FOR APPLYING TV SETTINGS TO PLURAL TVS THROUGH A NETWORK

(75) Inventors: Tanmay Agnihotri, San Diego, CA (US); Ronaldo Diaz, San Diego, CA (US); Dongwook Kim, San Diego, CA (US)

(73) Assignee: Sony Corporation, Tokyo (JP)

(*) Notice: Subject to any disclaimer, the term of this patent is extended or adjusted under 35 U.S.C. 154(b) by 426 days.

(21) Appl. No.: 13/189,385

(22) Filed: Jul. 22, 2011

(65) Prior Publication Data
US 2013/0024884 A1 Jan. 24, 2013

(51) Int. Cl.
*H04N 21/214* (2011.01)
*H04N 21/258* (2011.01)
*H04N 21/41* (2011.01)
*H04N 21/485* (2011.01)
*H04N 21/6547* (2011.01)

(52) U.S. Cl.
CPC ..... *H04N 21/2143* (2013.01); *H04N 21/25891* (2013.01); *H04N 21/4122* (2013.01); *H04N 21/485* (2013.01); *H04N 21/6547* (2013.01)

(58) Field of Classification Search
CPC ............ H04N 21/485; H04N 21/4852; H04N 21/4854; H04N 21/4856; H04N 21/4858
USPC .................................... 725/74, 78, 80, 36, 46
See application file for complete search history.

(56) References Cited

U.S. PATENT DOCUMENTS

| | | | |
|---|---|---|---|
| 2005/0028208 A1* | 2/2005 | Ellis et al. | 725/58 |
| 2006/0161956 A1 | 7/2006 | Wasilewski et al. | |
| 2006/0212479 A1* | 9/2006 | Habas et al. | 707/104.1 |
| 2010/0122289 A1* | 5/2010 | Jean et al. | 725/37 |
| 2011/0078748 A1* | 3/2011 | Park | 725/78 |
| 2011/0302607 A1* | 12/2011 | Warrick et al. | 725/39 |
| 2011/0314492 A1* | 12/2011 | Cassidy et al. | 725/30 |
| 2012/0089713 A1* | 4/2012 | Carriere | 709/222 |

OTHER PUBLICATIONS

"Panasonic Hotel System Server (HSS1000) and Clone Box (HDC1000)" Aug. 24, 2009, http://panasonic.net/proplasma/download/pdf/catalogs/hos_NA0910.pdf.
IPTV Manager Pro From Exterity, "Knowledge and Control Delivered. Welcome to the Revolution in Building IPTV". Jan. 15, 2009, http://www.exterity.com/files/downloads/IPTVmanager.pdf.
Philips, "The Philips Smart Gateway (PSG)", Philips Hospitality Philips Smart Gateway Commercial TV Remote Management Appliance US-PSG1000/27, Mar. 4, 2010, http://www.hotelbusiness.com/hb/link/channels/philips/media/Specs_US-PSG1000.pdf.
Dell, "Dell Commercial Display Learning Center", Jan. 6, 2011, http://www.dell.com/content/topics.aspx/us/segments/bsd/commercial_displays?c=us&l-en&cs=04.

* cited by examiner

*Primary Examiner* — Kyu Chae
(74) *Attorney, Agent, or Firm* — John L. Rogitz

(57) ABSTRACT

A system includes plural TVs, with a master TV accepting user input to establish TV settings. The system also includes a server accessing the TV settings from the master TV to send the settings to at least some of the other plural TVs over a network to establish respective TV settings on the other TVs.

12 Claims, 4 Drawing Sheets

SYSTEM AND METHOD FOR APPLYING TV SETTINGS TO PLURAL TVS THROUGH A NETWORK

FIELD OF THE INVENTION

The present application relates generally to TVs connected to each other through a network.

BACKGROUND OF THE INVENTION

As understood herein, cloning is a process in which data and/or settings from a master TV are transferred to auxiliary TVs in a network. Auxiliary TVs that have data and/or settings from a master TV transferred to them are referred to herein to as "slaves TVs". Presently, cloning requires that a storage device, such. as a USB drive, be engaged with the master TV so that data and/or settings files may be loaded onto the storage device. The storage device is then disengaged with the master TV and subsequently engaged with each slave TV to transfer the stored data and/or settings files to the slave TVs. As recognized by the present application, transferring master TV files to multiple slave TVs can be burdensome and consume unnecessary amounts of time and labor.

One particular environment where transferring master TV data and/or settings files to multiple slave TVs can be overburdensome and laborious is in a hotel TV network. It may be appreciated that engaging a storage device with each of, e.g., 200 slave TVs in a hotel to transfer the master TV's data and/or settings files to each slave TV can be particularly burdensome and time consuming. As understood herein, the present application reduces time, labor, and costs associated with transferring master TV data and/or settings files to multiple slave TVs in a network. However, while some aspects of the present application are described in particular reference to a hotel TV network environment, it is to be understood that the present application may apply to other TV network environments, such as, but not limited to, a home entertainment system and a restaurant entertainment system.

SUMMARY OF THE INVENTION

Accordingly, a system includes plural room TVs and a master TV accepting user input establishing TV settings. The system also includes a server accessing the TV settings from the master TV and sending the settings to at least some of the plural room TVs over a network. In response, the system establishes respective room TV settings to match the TV settings of the master TV. In example embodiments, the settings may include favorite channel settings, favorite guide settings, parental control settings, mosaic channel settings, home channel settings, and/or skin settings that are indicative of settings for background images and color schemes for presentation on a TV display.

If desired, the master TV may include a display presenting under control of a processor a first user interface (UI) showing a selector to "establish master TV settings", which, if selected, invokes a second UI on the display. The first UI may also show a selector to "apply master TV settings", which, if selected, invokes a third UI on the display. The second UI may include a selector to select one of a group of TVs in a list for which a settings file is to be established or changed. The second UI may also include a selector to indicate a user is done establishing settings. Additionally, the third UI may include a selector to apply master settings in a settings file to all TVs in the system and at least one selector to apply master settings in a settings file to a predefined subset of all TVs in the system.

In another aspect, a method includes receiving TV settings input from a master TV. The method also includes disseminating the TV settings input over a network to plural system TVs to cause the plural system TVs to establish their respective settings to match the TV settings input.

In still another aspect, a system includes at least one auxiliary TV and a master TV accepting user input establishing auxiliary TV settings. The system also includes a server accessing the auxiliary TV settings from the master TV. Once accessed, the server sends the auxiliary TV settings to at least one auxiliary TV, which in, response establishes the respective auxiliary TV settings on the at least one auxiliary TV.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
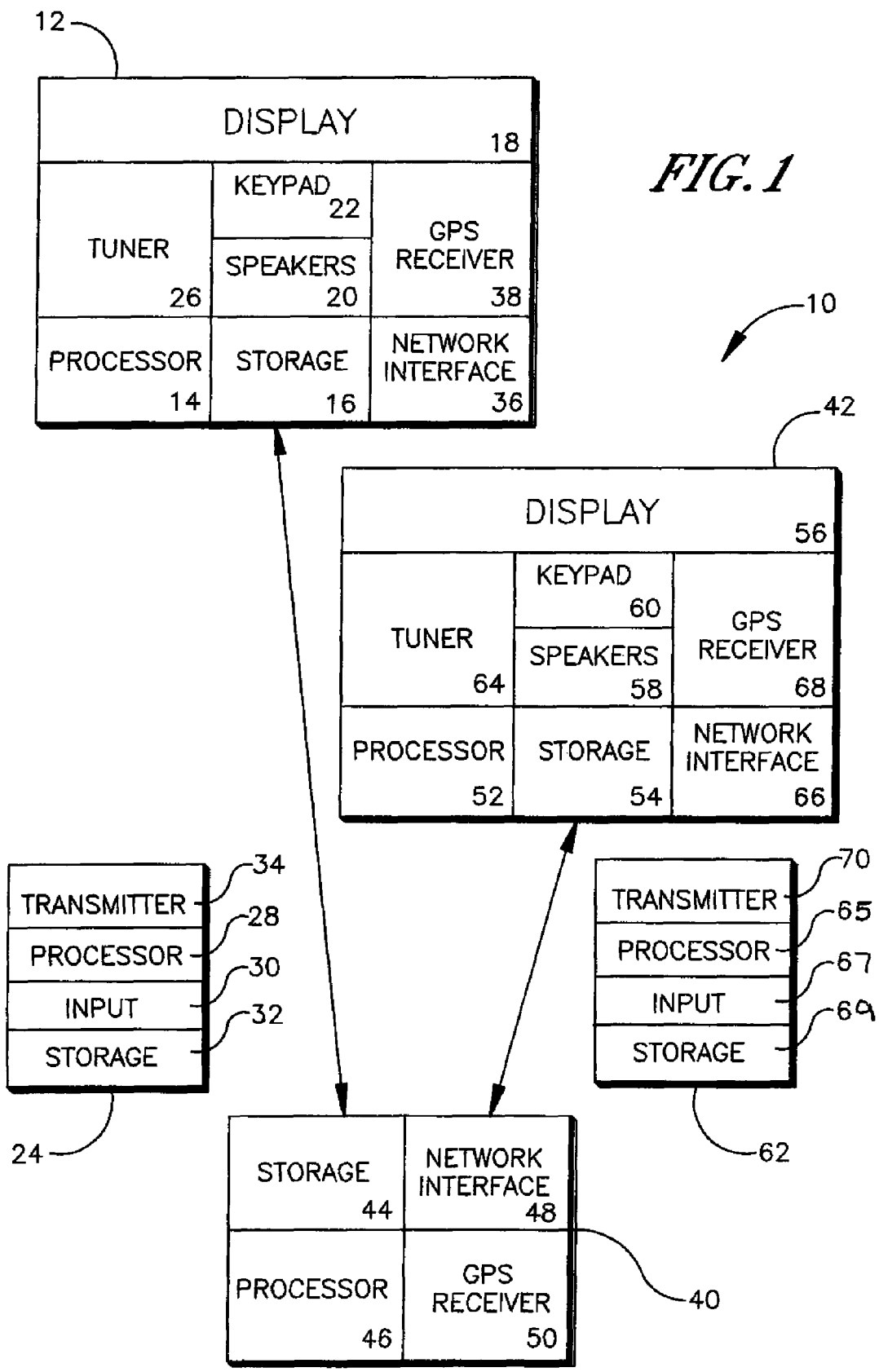
FIG. 1 is an example hardware block diagram of a system in accordance with present principles.

Referring initially to FIG. 1, an exemplary hardware block diagram of a system generally designated 10 is shown. The system 10 includes a master television (TV) 12, though it is to be understood that present principles may apply to a plurality of non-limiting consumer electronics devices. The master TV 12 has a processor 14 capable of executing logic, including the logic described herein. The master TV 12 also includes one or more non-transitory computer readable data storage medium(s) 16 such as, but not limited to, RAM-based storage (e.g., a chip implementing dynamic random access memory (DRAM)), flash memory, or disk-based-storage). Moreover, logic such as the logic described herein that, is executable by the processor 14 may be stored on the medium(s) 16 in accordance-with present principles.

As shown in FIG. 1, the master TV 12 also has one or more output devices such as a display 18 and speakers 20, where the output devices may be capable of outputting data and/or content, such as audio and visual content, to a user. The master TV 12 also includes one or more input devices capable of receiving input from a user, such as a keypad 22 and a remote commander 24. However, it is to be understood that other input devices may also be included on, or associated with, the master TV 12. Even further, it is to be understood that the display 18 may function as a touch-screen input device in example embodiments.

The master TV 12 also includes a TV tuner 26. Furthermore, it is to be understood that the remote commander 24 also has a processor 28, the processor 28 capable of executing user commands input through an input region 30 on the remote commander 24. The input region 30 may include control keys (not shown), may employ touch-screen technology, and/or may employ voice recognition technology in non-limiting embodiments.

The remote commander 24 also has at least one data storage medium 32, which may be capable of storing data in accordance with present principles. The data storage medium 32 may store information regarding, e.g., preset channel memory corresponding to particular buttons on the remote commander 24. Further still, the remote commander 24 includes a wireless transmitter 34 which may receive input from the processor 28 to produce an example electromagnetic wave, such, as an infrared signal, allowing the transmitter 34 to communicate with the master TV 12. Thus, the wireless transmitter 34 may transmit user input and/or commands received at the remote commander 24 to the master TV 12.

Continuing in reference to FIG. 1, the master TV 12 also includes a network interface 36, such as, but not limited to, a wired or wireless modem or wireless telephony transceiver that is capable of communicating with the processor 14 to provide connectivity to a wide area network, such as, but not limited to, the internet. However, it is to be understood that the TVs disclosed herein may be connected to any non-limiting network and capable of communication therethrough such as through a cable connection to a head end or a satellite uplink. Also in non-limiting embodiments, connectivity may be established through Wi-Fi technology and/or Ethernet technology.

The master TV 12 can also include a Global Positioning System (GPS) receiver 38 for sending and receiving GPS location information such as, but not limited to, latitudinal and longitudinal, coordinates in accordance with present principles. Furthermore, it is to be understood that the GPS receiver 38, as well as the other GPS components described below, may interact with a GPS satellite orbiting the earth, though a GPS satellite is not shown in FIG. 1 for clarity. Additionally, it is to be understood that GPS location information may be stored on the storage medium(s) of respective components in accordance with present principles.

Still in reference to FIG. 1, a server 40 is also shown. In example embodiments, the server 40 may be an internet server capable of communication with the master TV 12 and at least one slave TV 42 over a network in accordance with present principles. Further, the server 40 may have at least one non-transitory computer readable data storage medium 44 such as, but not limited to, RAM-based storage (e.g., a chip implementing dynamic random access memory (DRAM)), flash memory, or disk-based-storage). The storage medium 44 is understood to be capable of storing information such as, but not limited to, favorite channel settings, favorite guide settings, parental control settings, mosaic channel settings, home channel settings, DVR settings, and skin settings of one or more TV settings files in accordance with present principles.

Further, it is to be understood that information stored on the storage medium 44 may include data, settings and/or settings files determined at the master TV 12 and then downloaded to the at least one slave TV 42 in accordance with present principles. However, it is also to be understood that other data, media files, and/or content may be stored on the storage medium 44 and accessed by the master TV 12 and at least one slave TV 42. For instance, pay-per-view movies, music files, and electronic video games to be presented on the TV 12 and/or TV 42 may be stored on the storage-medium 44 along with master TV settings, settings files, and data. Note that, as used. herein, the terms "data," "media content," "media files," and "content" are non-limiting terms that may refer to a plurality of electronic data types and formats.

Continuing in reference to FIG. 1, the server 40 also includes a processor 46 capable of processing requests and/or commands received from the master TV 12, as well as transmitting data, settings files, and/or settings information from the TV 12 to the at least one slave TV 42 in accordance with present principles. Even further, the server 40 also includes a network interface 48, such as a wired or wireless modem or wireless telephony transceiver, capable of communication with the processor 46 to provide connectivity to a network in accordance with present principles. Further still, the server 40 includes a GPS receiver 50 for sending and receiving GPS location information in accordance with present principles.

Now in reference to the slave TV 42 shown in FIG. 1, the slave TV 42 has a processor 52, one or more non-transitory computer readable data storage medium(s) 54, a display 56, one or more output devices such as a display 56 and speakers 58, and one or more input devices such as a keypad 60 and a remote commander 62 in communication with the slave TV 42, all of which ate substantially similar in function and configuration to respective components on the master TV 12 as described above. Further, the slave TV 42 may also have a tuner 64, network interface 66, and GPS receiver 68, also substantially similar in function and configuration to respective components on the master TV 12 as described above. Additionally, the remote commander 62 has a processor 65, input region 67, at least one data storage medium. 69, and a wireless transmitter 70, all of which are also substantially similar in function and configuration to respective components on the remote commander 24 as described above.

It may therefore be appreciated that server 40 may communicate with the master TV 12 and at least one slave TV 42 over a network such as, but not limited to, the internet through their respective network interfaces over the network in example embodiments. It may be further appreciated that communication between the master TV 12, slave TV 42 and server 40 may include an exchange of master TV settings, settings files, and/or data between the master TVs 12 and 42 and server 40, including GPS location information. For example, the TVs 12 and 42 may download a software update from, the server 40, and may also upload and download TV settings, settings files, and/or in accordance with present principles.

Concluding the present description of FIG. 1, it is to be understood that the master TV 12, slave TV 42, remote commander 24, remote commander 62, and server 40 may include respective power supplies to provide voltage to each respective device, though the power supplies are not shown in FIG. 1 for clarity. For example, a battery or an AC/DC power supply may be included on the master TV 12, slave TV 42, remote commander 24, remote commander 62, and server 40.

Figure 2:
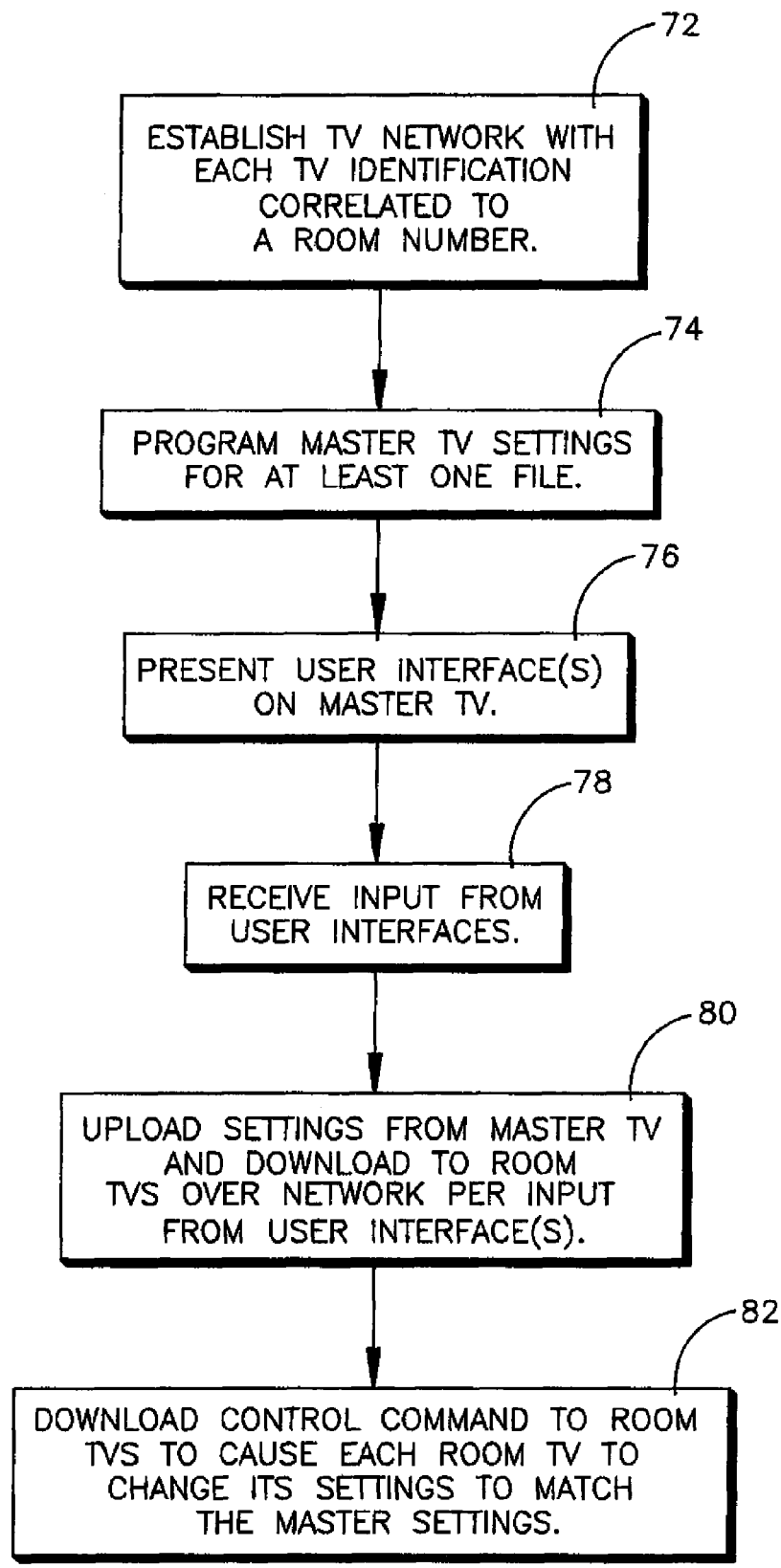
FIG. 2 is a flow chart of example logic for establishing system TV settings in accordance with present principles.

Now in reference to FIG. 2, a flow chart of example logic for establishing system TV settings in accordance with present principles is shown. Beginning at block 72, the logic establishes a TV network, which may be, without limitation, a TV network in a hotel where each TV in the network has an identifier (ID) correlated to the room number of the hotel in which the particular TV is disposed. For instance, in example embodiments, each TV ID may be an IP addresses associated with the TV and the room number in which the TV is disposed. It is to be understood that the IP addresses may be discovered by a hotel server, such as, e.g., the server 40 described above, using device discovery principles known in the art. Alternatively, or in addition to being discoverable by a hotel server, the IP addresses may be input by a user such as, but not limited to, a system administrator, a TV installer, a hotel maintenance individual, etc.

Further, it is to be understood that when room TVs are automatically discovered over the network, each TV's corresponding IP address received over the network may also be accompanied by the TV's GPS location in accordance with present principles. The server may thus correlate, using an electronic map of the hotel, each TV to a room location and, hence, a room number to eliminate the need for a user to perform manual programming of the same in example embodiments.

Moving from block 72 to block 74, the logic then programs master TV settings for at least one setting file. It is to, be understood that the settings programmed at block 74 may be at least in part determined based on input received from an input device associated with the master TV. Furthermore, it is to be understood that the logic may program master TV settings for more than one settings file in accordance with present principles. For example, the logic may program master TV settings files for both standard hotel room TVs and deluxe hotel suite TVs. Note that as used herein, a settings file is understood to be a non-limiting term that may include a package of settings data such that a singular "master TV settings file" contains some or all settings information for a group of TVs.

After block 74, the logic then moves to block 76 where the logic presents one or more user interfaces (UIs) on the master TV in accordance with present principles. Example UIs presented at block 76 are described further in reference to FIGS. 3 through 6, below. After presenting one or more UIs at block 76, the logic then moves to block 78 where the logic receives input from one or more of the UI(s) described herein. It is to be understood that, in example embodiments, input received from the UI(s) may be based at least in part on input received by the master TV processor that was input from a master TV input device in accordance with present principles. Then, at block 80, the logic uploads settings from the master TV to a server over a network in accordance with present principles, and then downloads the settings to one or more hotel room TVs from the server based on input received at block 78.

Concluding the example logic of FIG. 2 at block 82, the logic downloads at least one control command from the server to each slave TV to which the settings file is to be applied, mimicking user input to apply room TV settings at the room TV, to cause each room TV to change its settings to match the settings of the master TV settings file. Further, it is to be understood that the control command can be the same code as would be input from the room TV's RC to enter the settings menu, and that each setting to be established at the master TV can be the same code as would be generated when a user selects that setting and value from the settings menu of the room TV.

Figure 3:
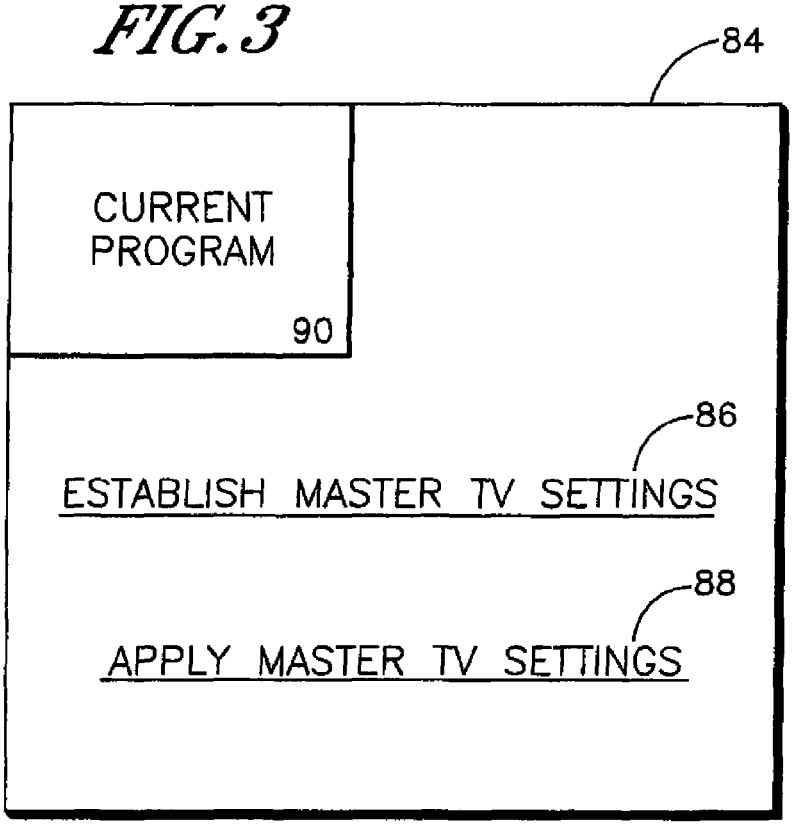
FIG. 3 is an example user interface to generally initiate establishment, programming, and/or adjustment of a master TV settings file in accordance with present principles.

Moving on to FIG. 3, an example user interface to generally initiate establishment, programming, and/or adjustment of a master TV settings file in accordance with present principles is shown. As may be seen from FIG. 3, a UI 84 presents a selector 86 to "Establish Master TV Settings" on a master TV display, such as the display 18 described in reference to FIG. 1. The UI 84 also presents a selector 88 to "Apply Master TV Settings" which may send a control command through the server to at least one room TV to apply the master TV settings in accordance with present principles. Also, if desired, the UI 84 may include a panel 90 showing, e.g., a program being currently presented by the master TV processor while the processor simultaneously displays the UI 84 in accordance with present principles.

Figure 4:
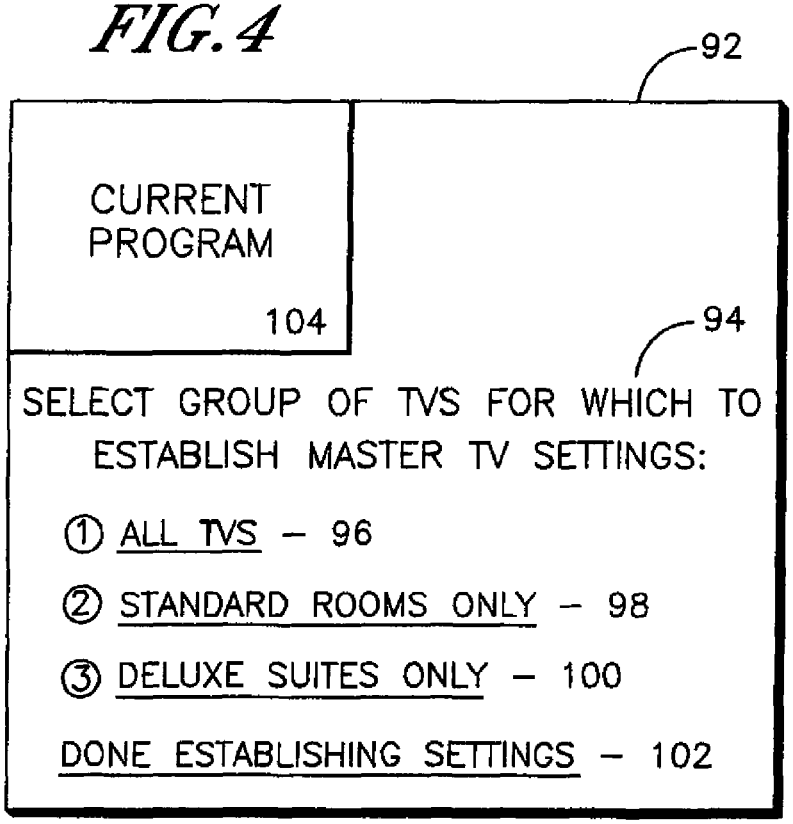
FIG. 4 is an example user interface for initiating establishment, programming, and/or adjustment of master TV settings for a particular settings file in accordance with present principles.
Figure 5:
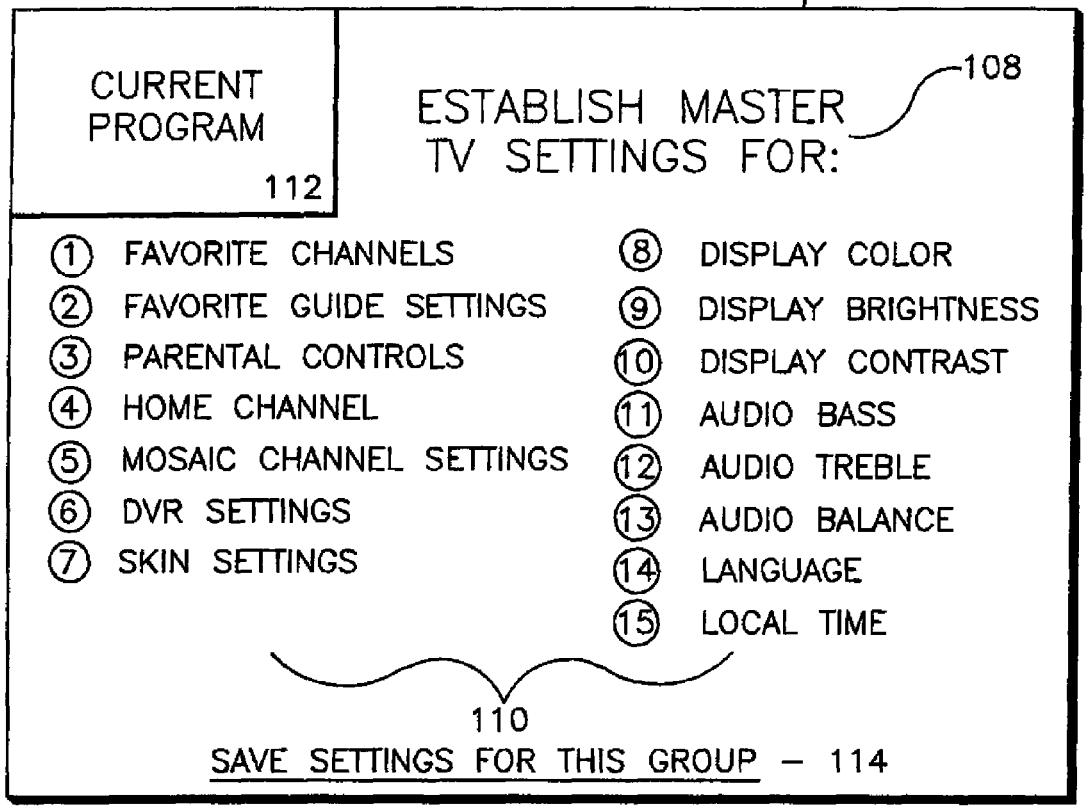
FIG. 5 is an example user interface for selecting which setting(s) to establish, program, and/or adjust from a list of selectors indicating available settings to be established, programmed and/or adjusted in accordance with present principles.
Figure 6:
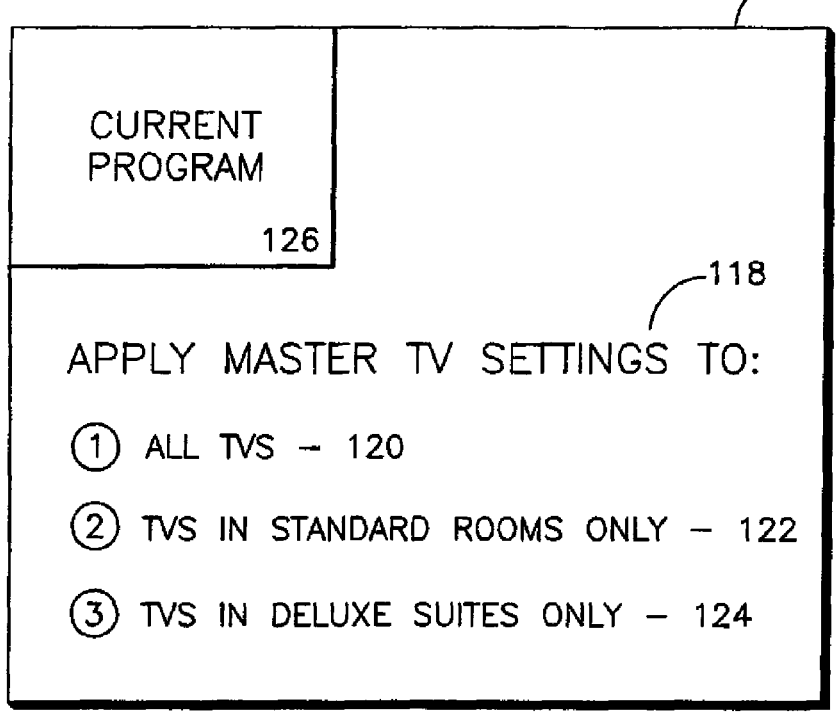
FIG. 6 is an example user interface for applying a master TV settings file to a group TVs in a TV network in accordance with present principles.

In example embodiments, if a user selects selector 86 to establish master TV settings for a settings file in accordance with present principles, the user interface of FIG. 4 is presented to the user. However, if the user selects selector 88 to apply master TV settings in accordance with present principles, the user interface of FIG. 6 appears on the display instead. FIGS. 4-6 will be discussed in turn below.

In reference to FIG. 4, an example user interface for initiating establishment, programming, and/or adjustment of master TV settings for a particular settings file in accordance with present principles is shown. Thus, FIG. 4 shows a UI 92 presented on a master TV display that includes text 94 indicating that a user can select one of a group of TVs for which to establish master TV settings. As shown in FIG. 4, the UI 92 presents, selectors for a user to select which group of TVs for which to establish settings, including a selector 96 to establish master TV settings for all TVs in the network, a selector 98 to establish, master TV settings for TVs in standard hotel rooms only, and a selector element 100 to establish master TV settings for TVs in deluxe suites only. Further, the UI 92 also presents a selector 102 for the user to indicate he or she is done establishing master TV settings, for a settings file. If a user selects selector 96, selector 98, or selector 100, the UI of FIG. 5 appears. If a user selects the. selector 102 instead, the UI of FIG. 6 appears. Also, if desired, the UI 92 may include a panel 104 showing, e.g., a program being currently presented by the master TV processor while the processor simultaneously displays the UI 92 in accordance with present-principles.

Now in reference to FIG. 5, an example user interface for selecting which particular setting(s) to establish, program, and/or adjust from a list of selectors indicating available settings to be established, programmed and/or adjusted in accordance with present principles is shown. Once a group of TVs is selected by, e.g., selecting selector 96, selector 98, or selector 100 on the UI 92, a UI 106 as shown in FIG. 5 appears next. As may be seen from FIG. 5, text 108 indicates that a user may select which setting(s) to establish, program, and/or adjust from a list of selectors 110. Also, if desired, the UI 106 may include a panel 112 showing, e.g., a program being currently presented by the master TV processor while the processor simultaneously displays the UI 106 in accordance with present principles.

The example selectors 110 shown in FIG. 5 are understood to be associated with various settings that may be established, programmed and/or adjusted for the group of TVs for which the settings file will apply. For example, the example UI 106 may include selectors for a user to set favorite channels, parental controls, digital video recording (DVR) settings, screen color, screen contrast, audio balance, language settings, and current local time for either TVs in deluxe suites or TVs in standard rooms of a hotel. Furthermore, it is to be understood that once one of the selectors such as, without limitation, the selectors shown in the list of selectors 110 is selected, another UI may appear for a user to establish, program, and/or adjust that particular setting accordingly.

Once the master TV settings for a group of TVs is determined at least in part through the UI 106, a "save settings" selector 114 may be selected to create and/or save all of the master TV settings shown on the UI 106 to a settings file associated with, e.g., "all TVs", "standard room TVs", and/or "deluxe suite TVs," depending on which of selectors 96, 98, and 100 were selected on the UI 92. Once the save settings selector 114 is selected (thereby causing the processor to save the settings to a settings file as described), the UI 92 described in reference to FIG. 4 may appear again. The settings establishment, programming, and/or adjustment process may then be repeated to establish, program, and/or adjust settings for a different settings file corresponding to another group of TVs (or even the same group of TVs), or the selector 102 of FIG. 4 may be selected instead, indicating that the user is done establishing, programming, and/or adjusting settings.

Selecting the selector 102. causes the example UI of FIG. 6 to appear. FIG. 6 shows an example user interface for applying a master TV settings file to a group TVs in a TV network in accordance with present principles. Thus, a UI 116 includes text 118 indicating that a user can select a particular selector to apply the master TV settings file established through the UI 106 to a particular group of TVs in the hotel network.

Accordingly, the exemplary UI 116 shows a selector 120 for a user to select to apply the master TV settings file to all TVs in the hotel, a selector 122 for a user to select to apply the master TV settings file to TVs in standard hotel rooms only (not applying the master TV settings to TVs in deluxe suites), and a selector 124 for a user to select to apply the master TV settings file to TVs in deluxe suites only (not applying the master TV settings to TVs in standard hotel rooms). Depending on which of the selectors 120, 122, and 124 are selected, the appropriate file(s) previously established and saved in accordance with present principles is read and/or downloaded to the designated TVs of the subgroup selected and a control command applies the file to those TVs.

As with the other UIs described herein, if desired, the UI 116 may include a panel 126 showing, e.g., a program being currently presented by the master TV processor while the processor simultaneously displays the UI 116 in accordance with present. principles. It may now be appreciated that the present application avoids the burdensome, laborious, and time consuming task of engaging a storage device with each of, e.g., 200 slave TVs in a hotel TV network to transfer a master TV data and/or settings file to each slave TV by allowing settings for all TVs in the hotel to be set at the master TV.

While the particular SYSTEM AND METHOD FOR APPLYING TV SETTINGS TO PLURAL TVS THROUGH A NETWORK is herein shown and described in detail, it is to be understood that the subject matter which is encompassed by the present invention is limited only by the claims.

What is claimed is:

1. A system, comprising:
   plural room displays;
   a master display configured for accepting user input establishing display settings; and
   a server configured for accessing the display settings from the master display and sending the settings to at least some of the plural room displays over a network, which in response establishes respective room display settings to match the display settings of the master display, wherein a UI is presentable on a display to establish and apply settings, wherein the master display includes a display device presenting under control of a processor a first user interface (UI) showing a selector to establish master settings, from which first UI can be invoked a second UI on the display device, the first UI having a selector to "apply master settings", which is operable to invoke a selector to apply master settings in a settings file to all displays in the system and at least one selector to apply master settings in a settings file to a predefined subset of all displays in the system;
   the server configured for receiving GPS location information of at least some of the room displays such that network addresses of the at least some of the room displays are correlatable to respective room locations using the GPS location and an electronic map of the room locations to eliminate the need for a user to perform manual programming of the GPS location information of the room displays.

2. The system of claim 1, wherein the settings include favorite channel settings.

3. The system of claim 1, wherein the settings include favorite guide settings.

4. The system of claim 1, wherein the settings include parental control settings.

5. The system of claim 1, wherein the settings include mosaic channel settings.

6. The system of claim 1, wherein the settings include home channel settings.

7. The system of claim 1, wherein the settings include skin settings that are indicative of settings for background images and color schemes for presentation on a display.

8. The system of claim 1, wherein the second UI includes a selector to select one of a group of displays in a list for which a settings file is to be established or changed, and a selector to indicate done establishing settings.

9. A method, comprising:
   receiving display settings input from a master display;
   disseminating the display settings input over a network to plural system displays to cause the plural system displays to establish their respective settings to match the display settings input, wherein the display settings input at the master display are input at least in part using a display device presenting under control of a processor on the master display a first user interface (UI) showing a selector to establish master settings, from which first UI can be invoked a second UI on the display device, the first UI having a selector to "apply master settings", which is operable to invoke a selector to apply master settings in a settings file to all displays in the system and at least one selector to apply master settings in a settings file to a predefined subset of all displays in the system; and
   receiving GPS location information of at least some of the system displays such that network addresses of the at least some of the system displays are correlatable to respective establishment locations using the GPS location and an electronic map of the establishment locations to eliminate the need for a user to perform manual programming of the GPS location information of the system displays.

10. The method of claim 9, wherein the second UI includes a selector to select one of a group of displays in a list for which a master display settings file is to be established or changed, and a selector to indicate establishing settings is complete.

11. The method of claim 9, wherein the predefined subset is determined at the master display.

12. The method of claim 9, wherein the predefined subset is determined at least in part using the geographic location of at least some of the system displays.

* * * * *